(12) United States Patent
Ishida et al.

(10) Patent No.: US 11,356,047 B2
(45) Date of Patent: Jun. 7, 2022

(54) MOTOR CONTROL APPARATUS

(71) Applicant: DENSO CORPORATION, Kariya (JP)

(72) Inventors: Jun Ishida, Kariya (JP); Makoto Taniguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 14 days.

(21) Appl. No.: 17/081,339

(22) Filed: Oct. 27, 2020

(65) Prior Publication Data
US 2021/0067079 A1 Mar. 4, 2021

Related U.S. Application Data

(63) Continuation of application No. PCT/JP2019/011109, filed on Mar. 18, 2019.

(30) Foreign Application Priority Data

Apr. 27, 2018 (JP) .............................. JP2018-086359

(51) Int. Cl.
 *H02P 25/20* (2006.01)
(52) U.S. Cl.
 CPC .................................. *H02P 25/20* (2013.01)
(58) Field of Classification Search
 CPC ........ H02P 25/22; H02P 25/20; H02P 23/009; H02M 7/5395; H02K 17/14; H02K 19/12; H02K 3/28
 See application file for complete search history.

(56) References Cited

U.S. PATENT DOCUMENTS

| | | | | |
|---|---|---|---|---|
| 6,008,616 A | * | 12/1999 | Nagayama | ............ B60L 15/025 318/773 |
| 9,800,193 B2 | * | 10/2017 | Mao | ........................ H02P 25/22 |
| 2017/0366129 A1 | * | 12/2017 | Hidaka | ................... H02P 25/20 |

* cited by examiner

*Primary Examiner* — Said Bouziane
(74) *Attorney, Agent, or Firm* — Oliff PLC

(57) ABSTRACT

A motor control apparatus includes: a high-pole-number controller that generates a voltage command for high-pole-number drive of an electric motor and controls operation of the electric motor under the high-pole-number drive; a low-pole-number controller that generates a voltage command for low-pole-number drive of the electric motor and controls operation of the electric motor under the low-pole-number drive; and a priority pole-number determiner that determines which one of the high-pole-number drive and the low-pole-number drive is to be given priority during switching between the high-pole-number and low-pole-number drives. Moreover, during the switching, of the high-pole-number and low-pole-number controllers, the controller corresponding to the drive given priority by the priority pole-number determiner calculates the voltage command for the drive given priority; and the controller corresponding to the drive not given priority calculates, based on the voltage command for the drive given priority, the voltage command for the drive not given priority.

14 Claims, 14 Drawing Sheets

FIG.8

$$\begin{bmatrix} V_u^* \\ V_v^* \\ V_w^* \\ V_x^* \\ V_y^* \\ V_z^* \end{bmatrix} = \sqrt{\frac{2}{3}} \begin{bmatrix} \cos(\theta_L) & -\sin(\theta_L) & \cos(\theta_H) & -\sin(\theta_H) \\ \cos(\theta_L - \frac{1}{3}\pi) & -\sin(\theta_L - \frac{1}{3}\pi) & \cos(\theta_H - \frac{2}{3}\pi) & -\sin(\theta_H - \frac{2}{3}\pi) \\ \cos(\theta_L - \frac{2}{3}\pi) & -\sin(\theta_L - \frac{2}{3}\pi) & \cos(\theta_H - \frac{4}{3}\pi) & -\sin(\theta_H - \frac{4}{3}\pi) \\ \cos(\theta_L - \frac{3}{3}\pi) & -\sin(\theta_L - \frac{3}{3}\pi) & \cos(\theta_H) & -\sin(\theta_H) \\ \cos(\theta_L - \frac{4}{3}\pi) & -\sin(\theta_L - \frac{4}{3}\pi) & \cos(\theta_H - \frac{2}{3}\pi) & -\sin(\theta_H - \frac{2}{3}\pi) \\ \cos(\theta_L - \frac{5}{3}\pi) & -\sin(\theta_L - \frac{5}{3}\pi) & \cos(\theta_H - \frac{4}{3}\pi) & -\sin(\theta_H - \frac{4}{3}\pi) \end{bmatrix} \begin{bmatrix} V_{dL}^{} \\ V_{dL}^{} \\ V_{dH}^{} \\ V_{qH}^{} \end{bmatrix}$$

FIG.9

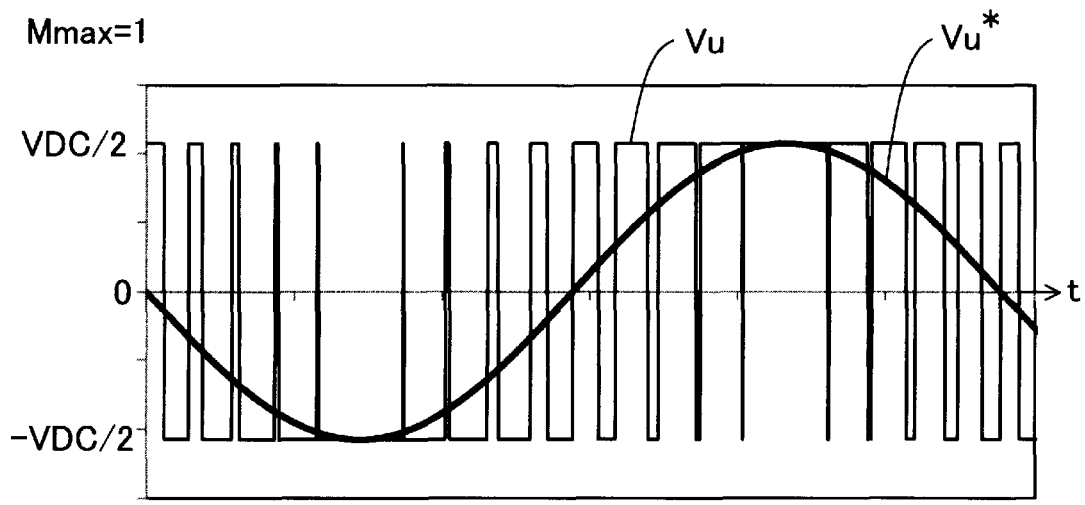

HIGH-POLE-NUMBER DRIVE ⇒ LOW-POLE-NUMBER DRIVE

MOTOR CONTROL APPARATUS

CROSS-REFERENCE TO RELATED APPLICATIONS

The present application is a continuation application of International Application No. PCT/JP2019/011109 filed on Mar. 18, 2019, which is based on and claims priority from Japanese Patent Application No. 2018-086359 filed on Apr. 27, 2018. The contents of these applications are hereby incorporated by reference in their entirety into the present application.

BACKGROUND

1 Technical Field

The present invention relates to motor control apparatuses.

2 Description of Related Art

Various proposals have been made for realizing electric motors capable of rotating at high speed and outputting high torque. For example, Japanese Patent Application Publication No. JP H08-223999 A discloses an electric motor that can both rotate at high speed and output high torque. The electric motor is a six-phase electric motor whose drive mode is switched between high-pole-number drive and low-pole-number drive by changing the relationship in phase between six phase currents. Under the high-pole-number drive, the electric motor can output high torque in a low-rotational speed region. In contrast, under the low-pole-number drive, the electric motor can rotate at high speed. Moreover, an operation control apparatus described in the patent document includes a high-pole-number controller for generating a high-pole-number current command and a low-pole-number controller for generating a low-pole-number current command. During the switching between the high-pole-number drive and the low-pole-number drive, one of the current commands generated by the high-pole-number and low-pole-number controllers is gradually increased while the other of the current commands is gradually decreased.

SUMMARY

According to the present disclosure, there is provided a motor control apparatus. The motor control apparatus is capable of performing, for an electric motor having a plurality of windings, switching of the number of poles of the electric motor between m different numbers of poles, where m is an integer greater than or equal to 2. The control apparatus includes a high-pole-number controller, a low-pole-number controller and a priority pole-number determiner. The high-pole-number controller generates a voltage command for high-pole-number drive of the electric motor, where the number of poles of the electric motor is larger, and controls operation of the electric motor under the high-pole-number drive. The low-pole-number controller generates a voltage command for low-pole-number drive of the electric motor, where the number of poles of the electric motor is smaller, and controls operation of the electric motor under the low-pole-number drive. The priority pole-number determiner determines which one of the high-pole-number drive and the low-pole-number drive is to be given priority during switching between the high-pole-number drive and the low-pole-number drive. Moreover, during the switching between the high-pole-number drive and the low-pole-number drive, of the high-pole-number controller and the low-pole-number controller, the controller corresponding to the drive given priority by the priority pole-number determiner calculates the voltage command for the drive given priority; and the controller corresponding to the drive not given priority calculates, based on the voltage command for the drive given priority, the voltage command for the drive not given priority.

BRIEF DESCRIPTION OF THE DRAWINGS

FIG. 8 is a matrix illustrating operation of a coordinate converter shown in FIG. 3.

FIG. 9 is an explanatory diagram illustrating both a u-phase voltage command and a u-phase output voltage of the inverter when a first modulation-factor upper limit is equal to 1.

DESCRIPTION OF EMBODIMENTS

Figure 1:
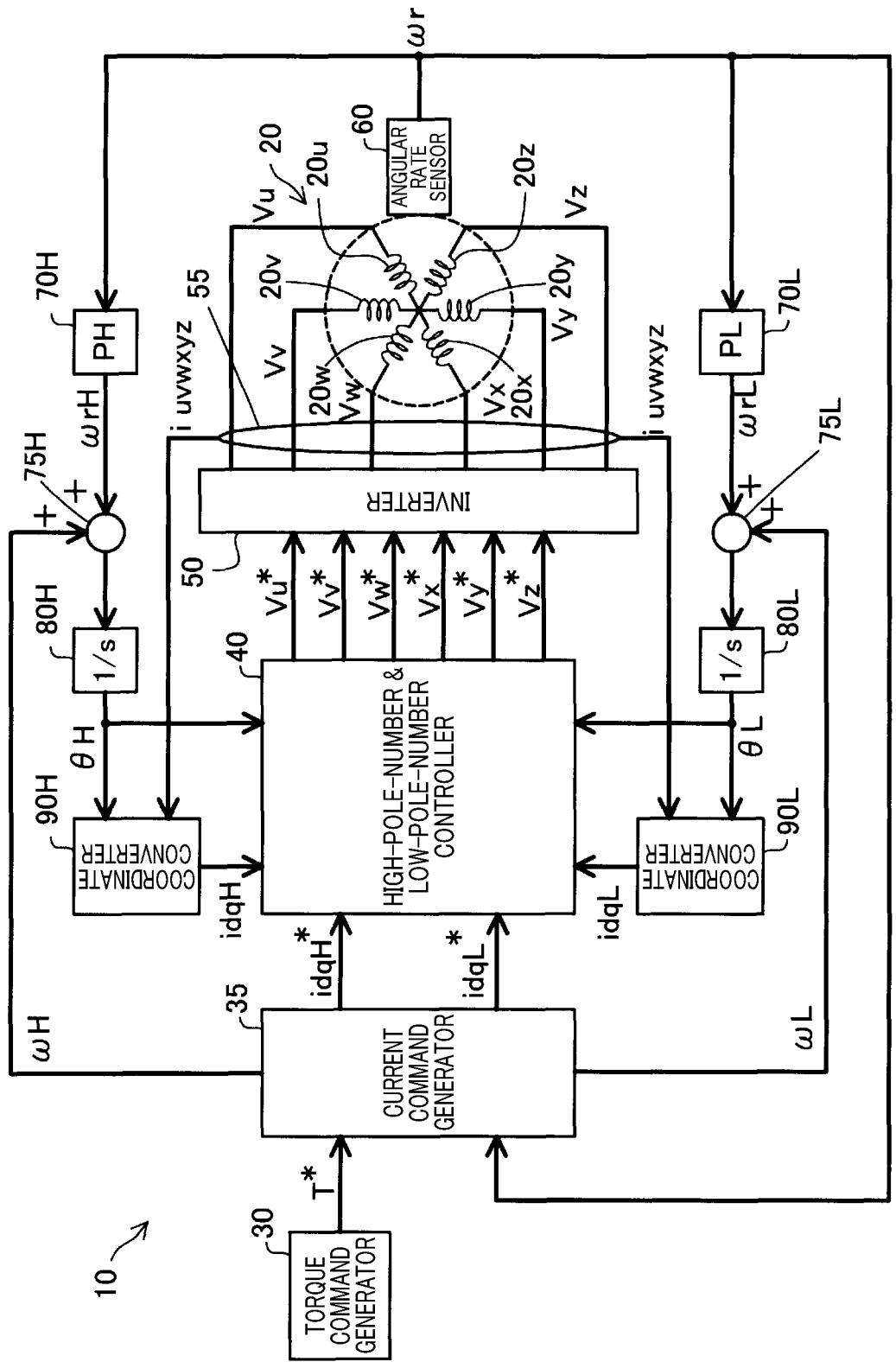
FIG. 1 is an explanatory diagram illustrating the overall configuration of a motor control apparatus according to a first embodiment.

In the electric motor disclosed in the aforementioned patent document (i.e., Japanese Patent Application Publication No. JP H08-223999 A), during transition of the switching, each phase voltage applied to a multi-phase coil of the electric motor is equal to the sum of a voltage determined by a high-pole-number voltage command value and a voltage determined by a low-pole-number voltage command value. However, in the operation control apparatus described in the patent document, the high-pole-number voltage command value and the low-pole-number voltage command value are individually calculated. Consequently, during the transition period for switching between the high-pole-number drive and the low-pole-number drive, the sum of the high-pole-number voltage command value and the low-pole-number voltage command value may become a voltage that cannot be outputted from an electric power source. The inventors of the present application have found, through detailed investigation, that in such a case, it may become impossible to perform current control according to the voltage commands, thus resulting in overcurrent or large torque variation.

In contrast, with the configuration of the motor control apparatus according to the present disclosure, it is possible to prevent, during the switching between the high-pole-number drive and the low-pole-number drive, the occurrence of a phenomenon where an electric power source is requested to output, for the operation of the electric motor, a voltage that cannot be outputted from the electric power source. Moreover, it is also possible to suppress torque variation of the electric motor during the switching in comparison with the case of calculating the voltage command for the high-pole-number drive and the voltage command for the low-pole-number drive individually.

In the motor control apparatus according to the present disclosure, the high-pole-number controller and the low-pole-number controller may calculate, based on the operating state of the electric motor, first voltage commands and first modulation-factor commands respectively for the high-pole-number drive and the low-pole-number drive. Of the high-pole-number controller and the low-pole-number controller, the controller corresponding to the drive given priority may generate, based on the first voltage command for the drive given priority, a second voltage command for the drive given priority as the voltage command for the drive given priority; and the controller corresponding to the drive not given priority may generate, based on the first voltage command for the drive not given priority and the first modulation-factor command for the drive given priority, a second voltage command for the drive not given priority as the voltage command for the drive not given priority. The second voltage command for the drive given priority and the second voltage command for the drive not given priority may constitute a combination of voltages that can be simultaneously outputted respectively in the high-pole-number drive and the low-pole-number drive. In this case, it will become possible to more reliably prevent, during the switching between the high-pole-number drive and the low-pole-number drive, the occurrence of an unstable phenomenon where an electric power source is requested to output, for the operation of the electric motor, a voltage that cannot be outputted from the electric power source. Moreover, it will also become possible to more effectively suppress torque variation of the electric motor during the switching in comparison with the case of calculating the voltage command for the high-pole-number drive and the voltage command for the low-pole-number drive individually.

In the motor control apparatus according to the present disclosure, the priority pole-number determiner may determine, based on the operating state of the electric motor, which one of the high-pole-number drive and the low-pole-number drive is to be given priority. In this case, it will become possible to suitably control the electric motor based on the operating state of the electric motor.

In the motor control apparatus according to the present disclosure, during the switching of the drive of the electric motor from the high-pole-number drive to the low-pole-number drive, the controllers may generate the respective second voltage commands with the low-pole-number drive being given priority. In this case, it will become possible to quickly build up torque corresponding to the low-pole-number drive, thereby reducing the switching time.

In the motor control apparatus according to the present disclosure, during the switching of the drive of the electric motor from the low-pole-number drive to the high-pole-number drive, the controllers may generate the respective second voltage commands with the low-pole-number drive being given priority. In this case, it will become possible to maintain torque corresponding to the low-pole-number drive, thereby suppressing torque variation.

In the motor control apparatus according to the present disclosure, during the switching of the drive of the electric motor from the low-pole-number drive to the high-pole-number drive, the controllers may generate the respective second voltage commands with the high-pole-number drive being given priority. In this case, it will become possible to quickly build up torque corresponding to the high-pole-number drive, thereby reducing the switching time.

In the motor control apparatus according to the present disclosure, during the switching of the drive of the electric motor from the high-pole-number drive to the low-pole-number drive, the controllers may generate the respective second voltage commands with the high-pole-number drive being given priority. In this case, it will become possible to maintain torque corresponding to the high-pole-number drive, thereby suppressing torque variation.

In the motor control apparatus according to the present disclosure, the controller corresponding to the drive given priority may generate the second voltage command for the drive given priority by limiting the first voltage command for the drive given priority so as not to exceed a first modulation-factor upper limit. The controller corresponding to the drive not given priority may generate the second voltage command for the drive not given priority by limiting the first voltage command for the drive not given priority so as not to exceed a second modulation-factor upper limit that is generated from the second voltage command for the drive given priority. In this case, it will become possible to limit the voltage commands respectively for the high-pole-number and low-pole-number drives to voltages that can be simultaneously outputted respectively in the high-pole-number and low-pole-number drives.

In the motor control apparatus according to the present disclosure, the first modulation-factor upper limit may be a value such that during operation of the electric motor under either the high-pole-number drive or the low-pole-number drive, an inverter, which is configured to supply voltages to the windings of the electric motor, operates within a linear region. The second modulation-factor upper limit may be a value obtained by subtracting a modulation factor command, which corresponds to the second voltage command for the drive given priority, from the first modulation-factor upper limit. In this case, during the operation of the electric motor under both the high-pole-number and low-pole-number drives, it will still be possible to have the inverter operating in the linear region, thereby suppressing torque ripple due to harmonics.

In the motor control apparatus according to the present disclosure, the first modulation-factor upper limit may be larger than a value such that during operation of the electric motor under either the high-pole-number drive or the low-pole-number drive, an inverter, which is configured to supply voltages to the windings of the electric motor, operates within a linear region. The second modulation-factor upper limit may be a value such that a peak of a total phase-voltage command, which is the sum of the second voltage command for the drive given priority and the second voltage command for the drive not given priority, exceeds ½ of an electric power source voltage. In this case, it will become possible to switch the number of poles of the electric motor from a higher-output region. Moreover, it will also become possible to utilize a higher voltage for both the high-pole-number drive and the low-pole-number drive during the switching of the number of poles, thereby improving the electric current responsiveness during the switching.

In the motor control apparatus according to the present disclosure, the first modulation-factor upper limit may be equal to $4/\pi$. In this case, it will become possible to maximally utilize the electric power source voltage of the inventor.

In the motor control apparatus according to the present disclosure, when a peak of a total phase-voltage command, which is the sum of the second voltage command for the drive given priority and the second voltage command for the drive not given priority, exceeds ½ of an electric power source voltage, the high-pole-number controller and the low-pole-number controller may generate, as the voltage commands for the high-pole-number drive and the low-pole-number drive, third voltage commands by multiplying the respective second voltage commands by respective amplitude compensation gains that are larger than 1. In this case, when the peak of the total phase-voltage command exceeds ½ of the electric power source voltage, it will still be possible to have the amplitudes of a high-pole-number fundamental component and a low-pole-number fundamental component of a phase voltage outputted from the inverter respectively coinciding with the amplitudes of a fundamental component of a phase-voltage command corresponding to the second voltage command for the high-pole-number drive and a fundamental component of a phase-voltage command corresponding to the second voltage command for the low-pole-number drive.

In the motor control apparatus according to the present disclosure, the amplitude compensation gains may be set based on a high-pole-number modulation-factor command corresponding to the second voltage command for the high-pole-number drive and a low-pole-number modulation-factor command corresponding to the second voltage command for the low-pole-number drive. The values of the amplitude compensation gains may be set so that the amplitudes of a high-pole-number fundamental component and a low-pole-number fundamental component of a phase voltage outputted from an inverter respectively coincide with the amplitudes of a fundamental component of a phase-voltage command corresponding to the second voltage command for the high-pole-number drive and a fundamental component of a phase-voltage command corresponding to the second voltage command for the low-pole-number drive. In this case, it will become possible to suitably set the amplitude compensation gains.

In the motor control apparatus according to the present disclosure, when the peak of the total phase-voltage command, which is the sum of the second voltage command for the drive given priority and the second voltage command for the drive not given priority, is lower than or equal to ½ of the electric power source voltage, the second voltage commands may not be multiplied by the amplitude compensation gains. In this case, no amplitude-compensation will be performed, thus simplifying the computation.

Hereinafter, exemplary embodiments of the present disclosure will be described with reference to the drawings.

First Embodiment

FIG. 1 is an explanatory diagram illustrating the overall configuration of a motor control apparatus 10 for an electric motor 20 according to the first embodiment. In the present embodiment, the electric motor 20 is a six-phase motor that has windings 20u-20z of six phases star-connected together. Depending on the winding manner of the windings 20u-20z and the manner of applying voltages to the windings 20u-20z, the electric motor 20 can be selectively driven in two drive modes, i.e., high-pole-number drive and low-pole-number drive.

First, the overall configuration of the motor control apparatus 10 will be described. The motor control apparatus 10 includes a torque command generator 30, a current command generator 35, a high-pole-number & low-pole-number controller 40, an inverter 50, a current sensor 55, an angular rate sensor 60, mechanical angle-electrical angle converters 70H and 70L, adders 75H and 75L, integrators 80H and 80L and coordinate converters 90H and 90L. In addition, the suffix "H" or "L" added to the ends of reference numerals denotes that the designated devices are for the high-pole-number use or the low-pole-number use.

The torque command generator 30 calculates a torque command T* for commanding torque that is required to be generated by the electric motor 20. For example, in the case of the electric motor 20 being used in a vehicle, the torque command generator 30 calculates the torque command T* on the basis of the amount of depression of an accelerator pedal of the vehicle and the speed of the vehicle.

The current command generator 35 calculates, based on the torque command T* and the mechanical angular frequency ωr of the electric motor 20, a dq-axes current command idqH* for the high-pole-number drive, a dq-axes current command idqL* for the low-pole-number drive, a high-pole-number slip angular frequency ωH and a low-pole-number slip angular frequency ωL.

The high-pole-number & low-pole-number controller 40 calculates voltage commands Vu*, Vv*, Vw*, Vx*, Vy* and Vz* of the respective phases on the basis of the dq-axes current command idqH* for the high-pole-number drive, the dq-axes current command idqL* for the low-pole-number drive, high-pole-number dq-axes current idqH, low-pole-number dq-axes current idqL, a high-pole-number magnetic flux position θH and a low-pole-number magnetic flux position θL.

The inverter 50 generates, based on the voltage commands Vu*, Vv*, Vw*, Vx*, Vy* and Vz*, voltages Vu, Vv, Vw, Vx, Vy and Vz to be respectively applied to the windings 20u, 20v, 20w, 20x, 20y and 20z of the respective phases.

The current sensor 55 detects electric currents iu, iv, iw, ix, iy and iz (collectively denoted by "iuvwxyz" in FIG. 1 and the explanation given hereinafter) respectively flowing through the windings 20u, 20v, 20w, 20x, 20y and 20z of the respective phases.

The angular rate sensor 60 detects the mechanical angular frequency ωr of a rotor (not shown) of the electric motor 20 with reference to a predetermined position.

The mechanical angle-electrical angle converter 70H for the high-pole-number drive converts, based on the number of pole pairs in the high-pole-number drive, the mechanical angular frequency ωr into a high-pole-number electrical angular frequency ωrH which is an electrical angular frequency corresponding to the high-pole-number drive. On the other hand, the mechanical angle-electrical angle converter 70L for the low-pole-number drive converts, based on the number of pole pairs in the low-pole-number drive, the mechanical angular frequency ωr into a low-pole-number electrical angular frequency ωrL which is an electrical angular frequency corresponding to the low-pole-number drive.

The adder 75H for the high-pole-number drive adds the high-pole-number electrical angular frequency ωrH and the high-pole-number slip angular frequency ωH together. Then, the integrator 80H for the high-pole-number drive integrates the result of the addition outputted from the adder 75H, thereby calculating the high-pole-number magnetic flux position θH. On the other hand, the adder 75L for the low-pole-number drive adds the low-pole-number electrical angular frequency ωrL and the low-pole-number slip angular frequency ωL together. Then, the integrator 80L for the low-pole-number drive integrates the result of the addition outputted from the adder 75L, thereby calculating the low-pole-number magnetic flux position θL.

The coordinate converter 90H for the high-pole-number drive converts, based on the high-pole-number magnetic flux position θH, the multi-phase current iuvwxyz into the high-pole-number dq-axes current idqH. On the other hand, the coordinate converter 90L for the low-pole-number drive converts, based on the low-pole-number magnetic flux position θL, the multi-phase current iuvwxyz into the low-pole-number dq-axes current idqL.

Figure 2:
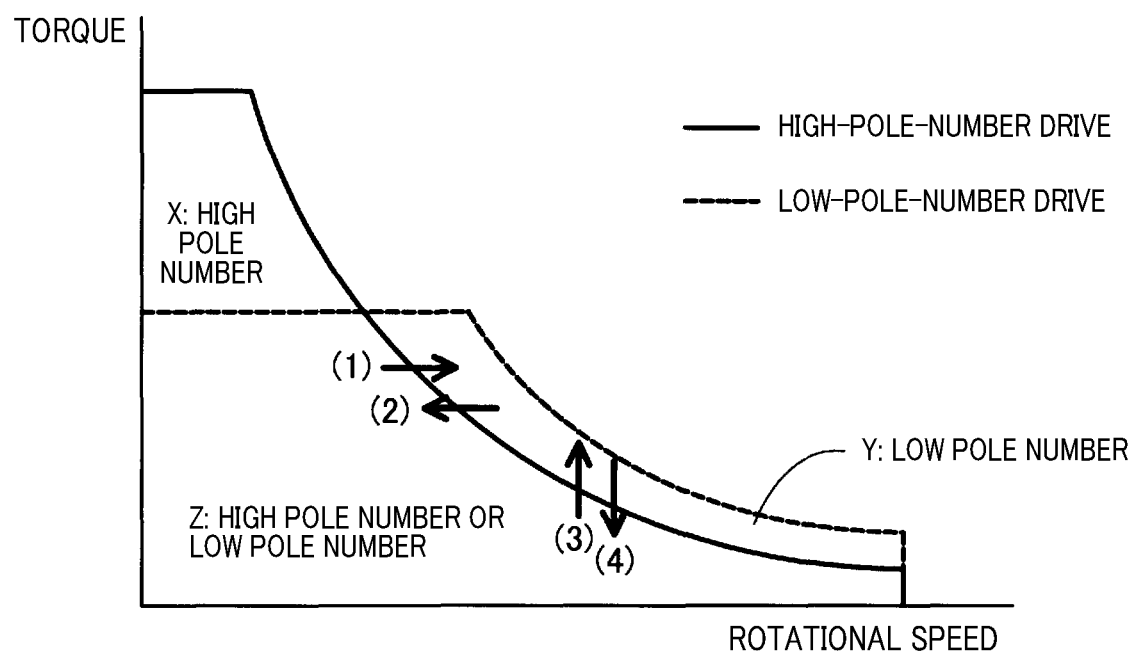
FIG. 2 is an explanatory diagram illustrating the torque-rotational speed characteristics of both high-pole-number drive and low-pole-number drive under the same voltages of an inverter.

FIG. 2 is an explanatory diagram illustrating the torque-rotational speed characteristics of both the high-pole-number drive and the low-pole-number drive under the same voltages of the inverter 50. In addition, the winding manner of the windings 20u-20z of the electric motor 20 includes both a winding manner for the high-pole-number drive and a winding manner for the low-pole-number drive. In the high-pole-number drive, the torque is lower in a high-rotational speed region but higher in a low-rotational speed region than in the low-pole-number drive. In other words, in the low-pole-number drive, the torque is lower in the low-rotational speed region but higher in the high-rotational speed region than in the high-pole-number drive. Therefore, it is possible to increase the torque by driving the electric motor 20 in the high-pole-number drive mode when it rotates in the low-rotational speed region and in the low-pole-number drive mode when it rotates in the high-rotational speed region. In addition, in FIG. 2, the region X is a region where the electric motor 20 can be driven only in the high-pole-number drive mode; the region Y is a region where the electric motor 20 can be driven only in the low-pole-number drive mode; and the region Z is a region where the electric motor 20 can be driven either in the high-pole-number drive mode or in the low-pole-number drive mode.

Hereinafter, explanation will be given of the voltages and currents of the respective phases in the high-pole-number drive and the low-pole-number drive.

(1) Voltages and currents in the high-pole-number drive
In the high-pole-number drive, the voltages and currents of the respective phases are as follows.
  (i) Voltages
  u phase: $VuH = VmH \cdot \cos(\theta H + \sigma H)$
  v phase: $VvH = VmH \cdot \cos(\theta H + \sigma H - 2\pi/3)$
  w phase: $VwH = VmH \cdot \cos(\theta H + \sigma H - 4\pi/3)$
  x phase: $VxH = VmH \cdot \cos(\theta H + \sigma H)$
  y phase: $VyH = VmH \cdot \cos(\theta H + \sigma H - 2\pi/3)$
  z phase: $VzH = VmH \cdot \cos(\theta H + \sigma H - 4\pi/3)$
  (ii) Currents
  u phase: $IuH = ImH \cdot \cos(\theta H + \alpha H)$
  v phase: $IvH = ImH \cdot \cos(\theta H + \alpha H - 2\pi/3)$
  w phase: $IwH = ImH \cdot \cos(\theta H + \alpha H - 4\pi/3)$
  x phase: $IxH = ImH \cdot \cos(\theta H + \alpha H)$
  y-phase: $IyH = ImH \cdot \cos(\theta H + \alpha H - 2\pi/3)$
  z phase: $IzH = ImH \cdot \cos(\theta H + \alpha H - 4\pi/3)$ As can be seen from the above equations, the u-phase voltage VuH and the x-phase voltage VxH are equal to each other. Moreover, the v-phase voltage VvH and the y-phase voltage VyH are equal to each other. The w-phase voltage VwH and the z-phase voltage VzH are equal to each other. That is, in the high-pole-number drive, the same voltage is applied to each winding pair consisting of two corresponding windings. Moreover, the voltage applied to both the u-phase winding 20u and the x-phase winding 20x, the voltage applied to both the v-phase winding 20v and the y-phase winding 20y and the voltage applied to both the w-phase winding 20w and the z-phase winding 20z are offset in phase from each other by $2\pi/3$.

(2) Voltages and currents in the low-pole-number drive
In the low-pole-number drive, the voltages and currents of the respective phases are as follows.
  (i) Voltages
  $VuL = VmL \cdot \cos(\theta L + \sigma L)$
  $VvL = VmL \cdot \cos(\theta L + \sigma L - \pi/3)$
  $VwL = VmL \cdot \cos(\theta L + \sigma L - 2\pi/3)$
  $VxL = VmL \cdot \cos(\theta L + \sigma L - 3\pi/3)$
  $VyL = VmL \cdot \cos(\theta L + \sigma L - 4\pi/3)$
  $VzL = VmL \cdot \cos(\theta L + \sigma L - 5\pi/3)$
  (ii) Currents
  $IuL = ImL \cdot \cos(\theta L + \alpha L)$
  $IvL = ImL \cdot \cos(\theta L + \alpha L - \pi/3)$
  $IwL = ImL \cdot \cos(\theta L + 60L - 2\pi/3)$
  $IxL = ImL \cdot \cos(\theta L + 60L - 3\pi/3)$
  $IyL = ImL \cdot \cos(\theta L + 60L - 4\pi/3)$
  $IzL = ImL \cdot \cos(\theta L + \alpha L - 5\pi/3)$ As can be seen from the above equations, in the low-pole-number drive, the u-phase voltage VuL and the v-phase voltage VvL are offset in phase from each other by $\pi/3$. The v-phase voltage VvL and the w-phase voltage VwL are also offset in phase from each other by $\pi/3$. The w-phase voltage VwL and the x-phase voltage VxL are also offset in phase from each other by $\pi/3$. The x-phase voltage VxL and the y-phase voltage VyL are also offset in phase from each other by $\pi/3$. The y-phase voltage VyL and the z-phase voltage VzL are also offset in phase from each other by $\pi/3$. The z-phase voltage VzL and the u-phase voltage VuL are also offset in phase from each other by $\pi/3$.

Switching between the high-pole-number drive and the low-pole-number drive is made in the following cases. In addition, in the following cases, the electric motor 20 is used in a vehicle.

(1) When the amount of depression of the accelerator pedal of the vehicle by the driver is constant and the vehicle is accelerated with the driving force kept constant, the drive mode of the electric motor 20 is switched from the high-pole-number drive to the low-pole-number drive as shown in FIG. 2 (1).

(2) When the amount of depression of the accelerator pedal of the vehicle by the driver is constant and the vehicle is decelerated on an uphill road or the like with the driving force kept constant, the drive mode of the electric motor 20 is switched from the low-pole-number drive to the high-pole-number drive as shown in FIG. 2 (2).

(3) When the driving force is suddenly increased upon depression of the accelerator pedal of the vehicle by the driver, the drive mode of the electric motor 20 is switched from the high-pole-number drive to the low-pole-number drive as shown in FIG. 2 (3).

(4) When the driving force is suddenly decreased upon release of the accelerator pedal of the vehicle by the driver, the drive mode of the electric motor 20 is switched from the low-pole-number drive to the high-pole-number drive as shown in FIG. 2 (4).

The electrical motor 20 is usually driven in either of the two drive modes, i.e., the high-pole-number drive and the low-pole-number drive. However, during the switching between the high-pole-number drive and the low-pole-number drive, the voltage commands for one of the two modes are gradually decreased while the voltage commands for the other of the two modes are gradually increased. That is, during the transition period of the switching, both the high-pole-number drive and the low-pole-number drive coexist. In the present embodiment, which of the high-pole-number drive and the low-pole-number drive is to be given priority is determined. Moreover, the voltage commands for the drive mode given priority are first calculated; then the voltage commands for the drive mode not given priority are calculated based on the voltage commands for the drive mode given priority.

Figure 3:
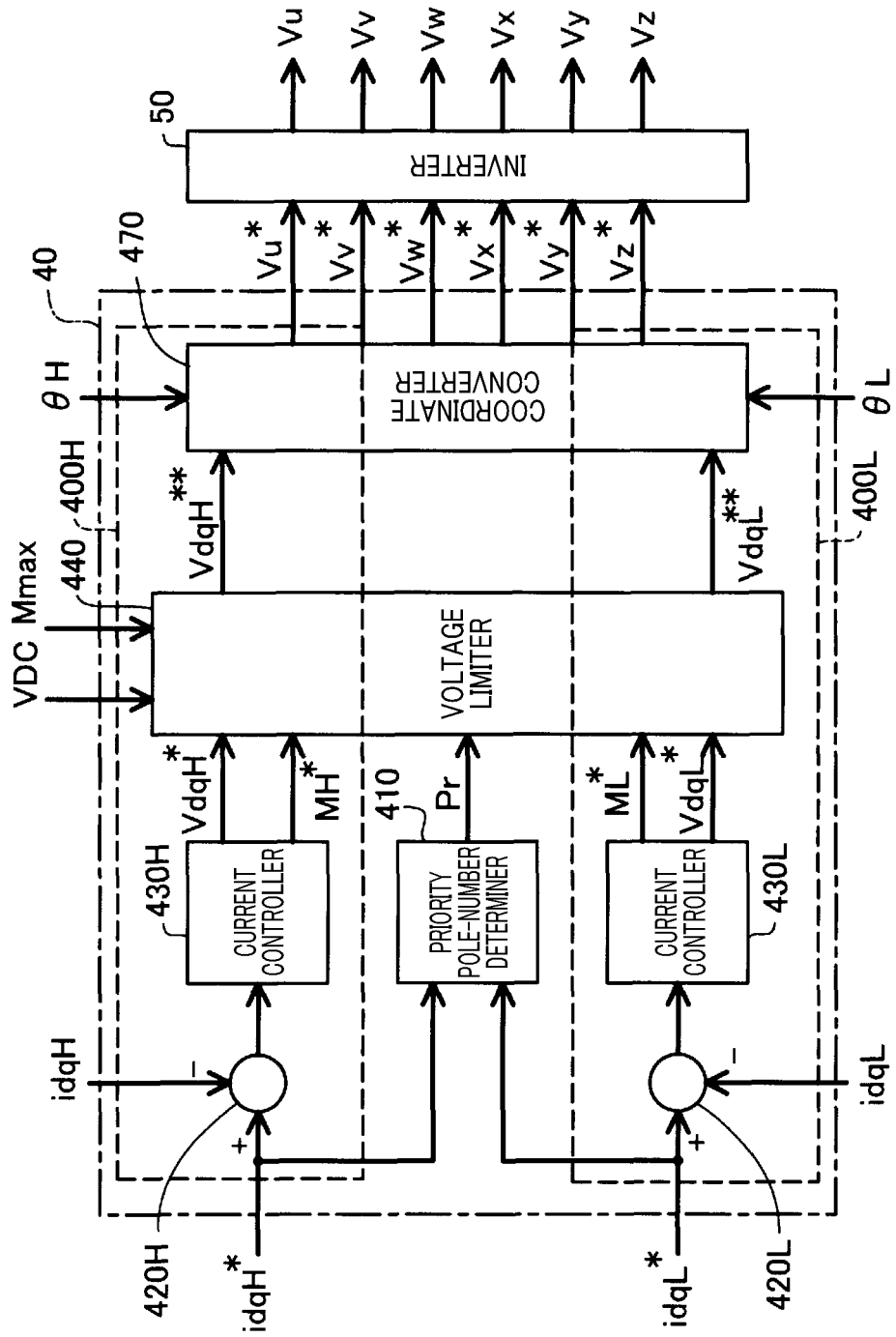
FIG. 3 is an explanatory diagram illustrating the overall configuration of a high-pole-number & low-pole-number controller.

FIG. 3 is an explanatory diagram illustrating the overall configuration of the high-pole-number & low-pole-number controller 40. As shown in FIG. 3, the high-pole-number & low-pole-number controller 40 includes a high-pole-number controller 400H, a low-pole-number controller 400L and a priority pole-number determiner 410. The high-pole-number controller 400H controls the high-pole-number drive, while the low-pole-number controller 400L controls the low-pole-number drive.

The priority pole-number determiner 410 determines, based on whether the switching is made from the high-pole-number drive to the low-pole-number drive or vice versa and on the operating state of the electric motor 20, which one of the high-pole-number drive and the low-pole-number drive is to be given priority. Then, the priority pole-number determiner 410 outputs a priority flag Pr indicative of the determination result. Specifically, the value of the priority flag Pr is set to 1 when the low-pole-number drive is given priority, and to 0 when the high-pole-number drive is given priority.

Before explanation of the configuration of the high-pole-number & low-pole-number controller 40 shown in FIG. 3, the determination by the priority pole-number determiner 410 will be described. First, in the case of the switching being made from the high-pole-number drive to the low-pole-number drive, the priority pole-number determiner 410 determines that the low-pole-number drive is to be given priority. This is because to suppress torque variation during the switching, it is necessary to quickly build up torque corresponding to the post-switching drive mode; therefore, priority is given to the low-pole-number drive which is the post-switching drive mode. It should be noted that priority may alternatively be given to the high-pole-number drive. Giving priority to the high-pole-number drive, it is possible to maintain torque corresponding to the high-pole-number drive, thereby suppressing torque variation.

Figure 4:
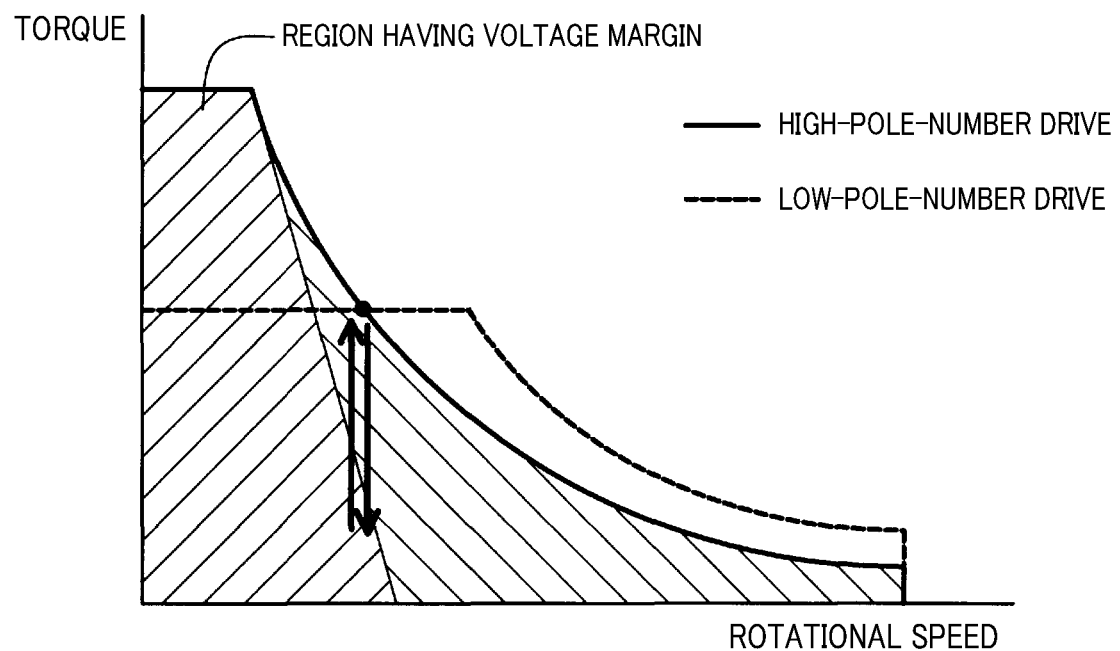
FIG. 4 is an explanatory diagram illustrating the torque-rotational speed characteristics of both the high-pole-number drive and the low-pole-number drive with a note on the voltage margin in the high-pole-number drive.

Next, explanation will be given of the determination made in the case of the switching being made from the low-pole-number drive to the high-pole-number drive. FIG. 4 is an explanatory diagram illustrating the torque-rotational speed characteristics of both the high-pole-number drive and the low-pole-number drive with a note on the voltage margin in the high-pole-number drive. In FIG. 4, the low-rotational speed region corresponding to the high-pole-number drive is a region where there is a voltage margin. In contrast, the high-rotational speed region corresponding to the high-pole-number drive is a region where there is no voltage margin. The priority pole-number determiner 410 first determines a post-switching operating point on the basis of both the dq-axes current command idqH* for the high-pole-number drive and the dq-axes current command idqL* for the low-pole-number drive. Then, the priority pole-number determiner 410 further determines, base on the determined post-switching operating point, which one of the high-pole-number drive and the low-pole-number drive is to be given priority.

(1) In the case of the post-switching operating point in the high-pole-number drive being within the region where there is a voltage margin, the priority pole-number determiner 410 determines that the high-pole-number drive is to be given priority. This is because to suppress torque variation during the switching, it is necessary to quickly build up torque corresponding to the post-switching drive mode; therefore, priority is given to the high-pole-number drive which is the post-switching drive mode.

(2) In the case of the post-switching operating point in the high-pole-number drive being within the region where there is no voltage margin, the priority pole-number determiner 410 determines that the low-pole-number drive is to be given priority. This is because if priority was given to the high-pole-number drive, upon the voltage used for the high-pole-number drive reaching a limit, there would be left no voltage available for the low-pole-number drive; consequently, it might become impossible to perform the low-pole-number control and thus torque shock might occur.

Referring back to FIG. 3, the high-pole-number controller 400H and the low-pole-number controller 400L will be described. The high-pole-number controller 400H includes a difference calculator 420H, a current controller 430H, a voltage limiter 440 and a coordinator converter 470. On the other hand, the low-pole-number controller 400L includes a difference calculator 420L, a current controller 430L, the voltage limiter 440 and the coordinate converter 470. That is, the high-pole-number controller 400H and the low-pole-number controller 400L share the voltage limiter 440 and the coordinate converter 470.

The difference calculator 420H calculates the difference between the dq-axes current command idqH* for the high-pole-number drive and the high-pole-number dq-axes current idqH, and sends the calculated difference to the current controller 430H. Then, based on the difference between the dq-axes current command idqH* for the high-pole-number drive and the high-pole-number dq-axes current idqH, the current controller 430H calculates a first high-pole-number d-axis voltage command VdH*, a first high-pole-number q-axis voltage command VqH* and a first high-pole-number modulation-factor command MH*. In addition, the first high-pole-number d-axis voltage command VdH* and the first high-pole-number q-axis voltage command VqH* are together shown as the first high-pole-number dq-axes voltage command VdqH* in FIG. 3. The first high-pole-number modulation-factor command MH* is calculated by the following equation.

[Equation 1]

$$M_H^* = \sqrt{\frac{2}{3}} \frac{\sqrt{(V_{dH}^*)^2 + (V_{qH}^*)^2}}{V_{DC}/2}, \quad (1)$$

where VDC is the voltage of an electric power source of the inverter 50.

Similarly, the difference calculator 420L calculates the difference between the dq-axes current command idqL* for the low-pole-number drive and the low-pole-number dq-axes current idqL, and sends the calculated difference to the current controller 430L. Then, based on the difference between the dq-axes current command idqL* for the low-pole-number drive and the low-pole-number dq-axes current idqL, the current controller 430L calculates a first low-pole-number d-axis voltage command VdL*, a first low-pole-number q-axis voltage command VqL* and a first low-pole-number modulation-factor command ML*. In addition, the first low-pole-number d-axis voltage command VdL* and the first low-pole-number q-axis voltage command VqL* are together shown as the first low-pole-number dq-axes voltage command VdqL* in FIG. 3. The first low-pole-number modulation-factor command ML* is calculated by the following equation.

[Equation 2]

$$M_L^* = \sqrt{\frac{2}{3}} \frac{\sqrt{(V_{dL}^*)^2 + (V_{qL}^*)^2}}{V_{DC}/2}, \quad (2)$$

The voltage limiter 440 calculates a second high-pole-number dq-axes voltage command VdqH and a second low-pole-number dq-axes voltage command VdqL on the basis of the first high-pole-number dq-axes voltage command VdqH*, the first high-pole-number modulation-factor command MH*, the first low-pole-number dq-axes voltage command VdqL*, the first low-pole-number modulation-factor command ML*, the value of the electric power source voltage VDC of the inverter 50 and a first modulation-factor upper limit Mmax. The first modulation-factor upper limit Mmax is a value such that during operation of the electric motor 20 under either the high-pole-number drive or the low-pole-number drive, the inverter 50 operates within a linear region, i.e., the voltage commands (Vu*, Vv*, Vw*, Vx*, Vy*, Vz*) of the respective phases are lower than or equal to VDC/2. In addition, the value of the electric power source voltage VDC and the first modulation-factor upper limit Mmax are preset, for example, depending on the electric motor 20 and stored in the voltage limiter 440.

Figure 5:
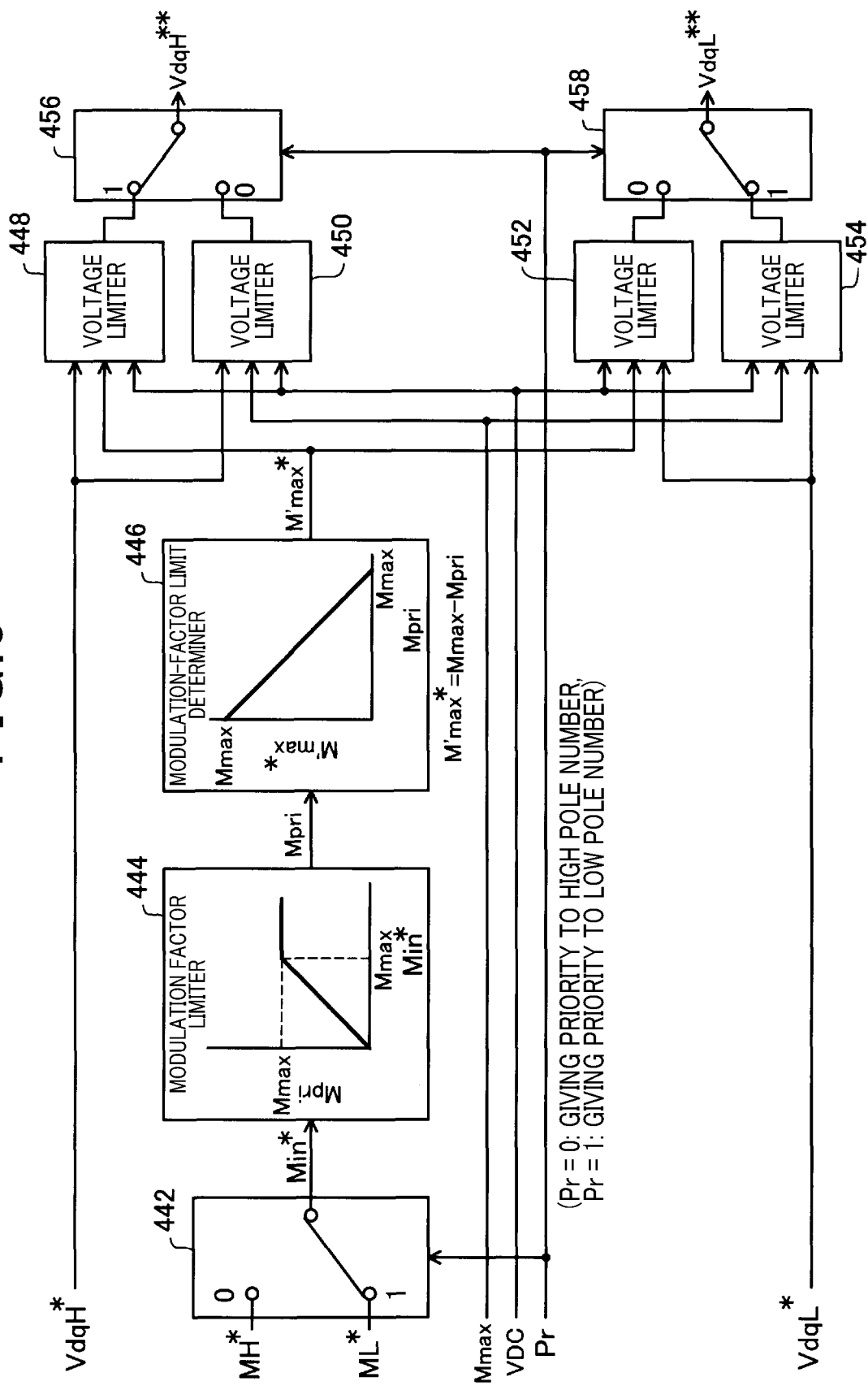
FIG. 5 is an explanatory diagram illustrating the detailed configuration of a voltage limiter.

FIG. 5 is an explanatory diagram illustrating the detailed configuration of the voltage limiter 440. As shown in FIG. 5, the voltage limiter 440 includes a first modulation-factor selector 442, a modulation factor limiter 444, a modulation-factor limit determiner 446, voltage limiters 448, 450, 452 and 454, and output selectors 456 and 458.

The first modulation-factor selector 442 determines, based on the value of the priority flag Pr, whether to set a first modulation factor Min*, which is to be sent to the modulation factor limiter 444, to the first high-pole-number modulation-factor command MH* or the first low-pole-number modulation-factor command ML*. Specifically, the first modulation-factor selector 442 sets the first modulation factor Min* to the first high-pole-number modulation-factor command MH* when the value of the priority flag Pr is equal to 0, and to the first low-pole-number modulation-factor command ML* when the value of the priority flag Pr is equal to 1.

The modulation factor limiter 444 calculates a limited modulation factor Mpri on the basis of the first modulation factor Min*. Specifically, the modulation factor limiter 444 sets the limited modulation factor Mpri to the value of the first modulation factor Min* when the first modulation factor Min* is lower than or equal to the first modulation-factor upper limit Mmax, and to the value of the first modulation-factor upper limit Mmax when the first modulation factor Min* is higher than the first modulation-factor upper limit Mmax.

The modulation-factor limit determiner 446 calculates a second modulation-factor upper limit M'max* by subtracting the limited modulation factor Mpri from the first modulation-factor upper limit Mmax. The modulation-factor limit determiner 446 may include, for example, a table for setting the second modulation-factor upper limit M'max* on the basis of the limited modulation factor Mpri. Alternatively, the modulation-factor limit determiner 446 may set the second modulation-factor upper limit M'max* on the basis of the limited modulation factor Mpri by computation.

The voltage limiter 448 calculates the second high-pole-number dq-axes voltage command VdqH** on the basis of the first high-pole-number dq-axes voltage command VdqH*, the second modulation-factor upper limit M'max* and the electric power source voltage VDC. The voltage limiter 450 calculates the second high-pole-number dq-axes voltage command VdqH** on the basis of the first high-pole-number dq-axes voltage command VdqH*, the first modulation-factor upper limit Mmax and the electric power source voltage VDC.

The voltage limiter 452 calculates the second low-pole-number dq-axes voltage command VdqL** on the basis of the first low-pole-number dq-axes voltage command VdqL*, the second modulation-factor upper limit M'max* and the electric power source voltage VDC. The voltage limiter 454 calculates the second low-pole-number dq-axes voltage command VdqL** on the basis of the first low-pole-number dq-axes voltage command VdqL*, the first modulation-factor upper limit Mmax and the electric power source voltage VDC.

Figure 6:
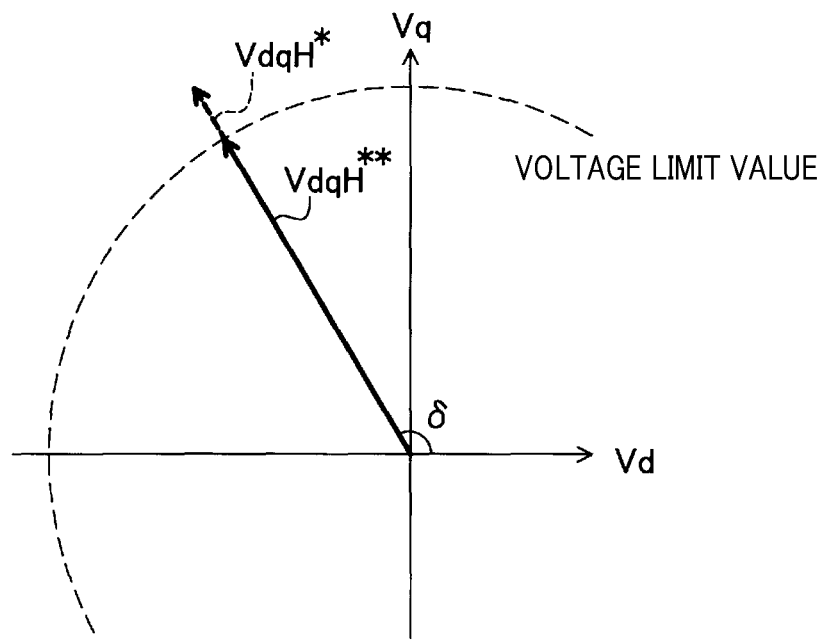
FIG. 6 is an explanatory diagram illustrating an example of operation of a voltage limiter.

FIG. 6 is an explanatory diagram illustrating an example of operation of the voltage limiter 448. In FIG. 6, the horizontal axis represents the d-axis voltage Vd while the vertical axis represents the q-axis voltage Vq; the dashed line represents a voltage limit value. The voltage limit value is calculated based on the electric power source voltage VDC and the second modulation-factor upper limit M'max*. When the amplitude of the vector of the first high-pole-number dq-axes voltage command VdqH* exceeds the voltage limit value, the voltage limiter 448 calculates the second high-pole-number dq-axes voltage command VdqH** by reducing the amplitude of the vector to the voltage limit value while maintaining the phase of the vector. In contrast, when the amplitude of the vector of the first high-pole-number dq-axes voltage command VdqH* is smaller than or equal to the voltage limit value, the voltage limiter 448 sets the second high-pole-number dq-axes voltage command VdqH** to be equal to the first high-pole-number dq-axes voltage command VdqH*.

Similarly, the voltage limiter 450 calculates a voltage limit value on the basis of the electric power source voltage VDC and the first modulation-factor upper limit Mmax. Moreover, when the amplitude of the vector of the first high-pole-number dq-axes voltage command VdqH* exceeds the voltage limit value, the voltage limiter 450 calculates the second high-pole-number dq-axes voltage command VdqH** by reducing the amplitude of the vector to the voltage limit value while maintaining the phase of the vector. In contrast, when the amplitude of the vector of the first high-pole-number dq-axes voltage command VdqH* is smaller than or equal to the voltage limit value, the voltage limiter 450 sets the second high-pole-number dq-axes voltage command VdqH** to be equal to the first high-pole-number dq-axes voltage command VdqH*.

The voltage limiter 452 calculates a voltage limit value on the basis of the electric power source voltage VDC and the second modulation-factor upper limit M'max*. Moreover, when the amplitude of the vector of the first low-pole-number dq-axes voltage command VdqL* exceeds the voltage limit value, the voltage limiter 452 calculates the second low-pole-number dq-axes voltage command VdqL** by reducing the amplitude of the vector to the voltage limit value while maintaining the phase of the vector. In contrast, when the amplitude of the vector of the first low-pole-number dq-axes voltage command VdqL* is smaller than or equal to the voltage limit value, the voltage limiter 452 sets the second low-pole-number dq-axes voltage command VdqL** to be equal to the first low-pole-number dq-axes voltage command VdqL*.

The voltage limiter 454 calculates a voltage limit value on the basis of the electric power source voltage VDC and the first modulation-factor upper limit Mmax. Moreover, when the amplitude of the vector of the first low-pole-number dq-axes voltage command VdqL* exceeds the voltage limit value, the voltage limiter 454 calculates the second low-pole-number dq-axes voltage command VdqL** by reducing the amplitude of the vector to the voltage limit value while maintaining the phase of the vector. In contrast, when the amplitude of the vector of the first low-pole-number dq-axes voltage command VdqL* is smaller than or equal to the voltage limit value, the voltage limiter 454 sets the second low-pole-number dq-axes voltage command VdqL** to be equal to the first low-pole-number dq-axes voltage command VdqL*.

Figure 7:
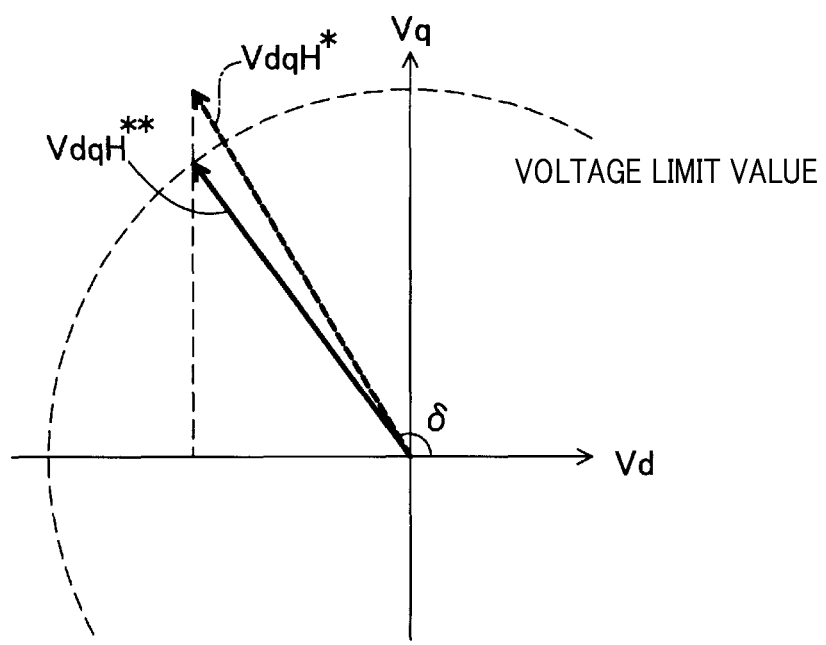
FIG. 7 is an explanatory diagram illustrating a modification of the operation of the voltage limiter.

FIG. 7 is an explanatory diagram illustrating a modification of the operation of the voltage limiter 448. In this modification, when the amplitude of the vector of the first high-pole-number dq-axes voltage command VdqH* exceeds the voltage limit value, the voltage limiter 448 calculates the second high-pole-number dq-axes voltage command VdqH** by reducing the amplitude of the vector to the voltage limit value by reducing the q-axis component VqH* of the vector while maintaining the d-axis component VdH* of the vector. In contrast, when the amplitude of the vector of the first high-pole-number dq-axes voltage command VdqH* is smaller than or equal to the voltage limit value, the voltage limiter 448 sets the second high-pole-number dq-axes voltage command VdqH** to be equal to the first high-pole-number dq-axes voltage command VdqH*. In addition, in this modification, the voltage limiters 450, 452 and 454 operate similarly to the voltage limiter 448.

Referring back to FIG. 5, the output selectors 456 and 458 will be described. When the value of the priority flag Pr is equal to 1, the output selector 456 selects the second high-pole-number dq-axes voltage command VdqH outputted from the voltage limiter 448. In contrast, when the value of the priority flag Pr is equal to 0, the output selector 456 selects the second high-pole-number dq-axes voltage command VdqH outputted from the voltage limiter 450. On the other hand, when the value of the priority flag Pr is equal to 1, the output selector 458 selects the second low-pole-number dq-axes voltage command VdqL outputted from the voltage limiter 454. In contrast, when the value of the priority flag Pr is equal to 0, the output selector 458 selects the second low-pole-number dq-axes voltage command VdqL outputted from the voltage limiter 452.

The above-described operation of the voltage limiter 440 can be summarized as follows. For the drive mode given priority, the voltage limiter 440 performs, with the first modulation-factor upper limit Mmax being an upper limit, the voltage limiting process on the first high-pole-number dq-axes voltage command VdqH* or the first low-pole-number dq-axes voltage command VdqL*. In contrast, for the drive mode not given priority, the voltage limiter 440 first calculates the limited modulation factor Mpri by limiting the first modulation-factor command (i.e., that one of the first high-pole-number modulation-factor command MH* and the first low-pole-number modulation-factor command ML* which corresponds to the drive mode not given priority) with the first modulation-factor upper limit Mmax. Then, the voltage limiter 440 calculates the second modulation-factor upper limit M'max* on the basis of the limited modulation factor Mpri. Thereafter, the voltage limiter 440 performs, with the second modulation-factor upper limit M'max* being an upper limit, the voltage limiting process on the first high-pole-number dq-axes voltage command VdqH* or the first low-pole-number dq-axes voltage command VdqL*.

FIG. 8 is a matrix illustrating operation of the coordinate converter 470 shown in FIG. 3. Using the matrix, the coordinate converter 470 calculates the voltage commands Vu*, Vv*, Vw*, Vx*, Vy* and Vz* of the respective phases on the basis of the second low-pole-number d-axis voltage command VdL, the second low-pole-number q-axis voltage command VqL, the second high-pole-number d-axis voltage command VdH and the second high-pole-number q-axis voltage command VqH.

FIG. 9 is an explanatory diagram illustrating both the u-phase voltage command Vu* and the u-phase output voltage Vu of the inverter 50 when the first modulation-factor upper limit Mmax is equal to 1. As shown in FIG. 9, the u-phase voltage command Vu* is in the form of a sine wave.

Figure 10:
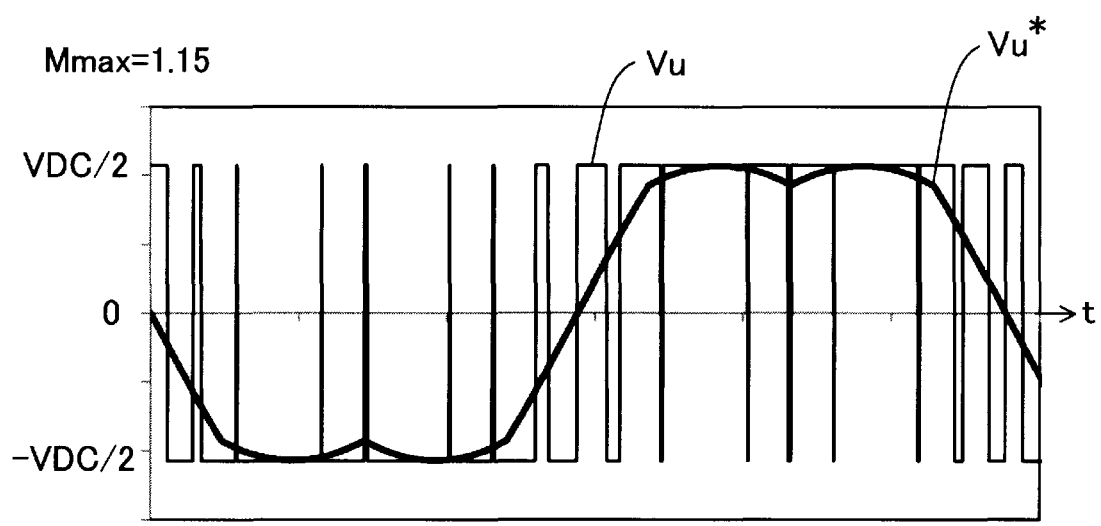
FIG. 10 is an explanatory diagram illustrating both the u-phase voltage command and the u-phase output voltage of the inverter when the first modulation-factor upper limit is equal to 1.15.

FIG. 10 is an explanatory diagram illustrating both the u-phase voltage command Vu* and the u-phase output voltage Vu of the inverter 50 when the first modulation-factor upper limit Mmax is equal to 1.15. As seen from FIG. 10, in this case, the voltage command Vu* is limited at the phases where the voltage command Vu* would become higher than DC/2 or lower than (−DC/2) without performing the limiting process.

Figure 11:
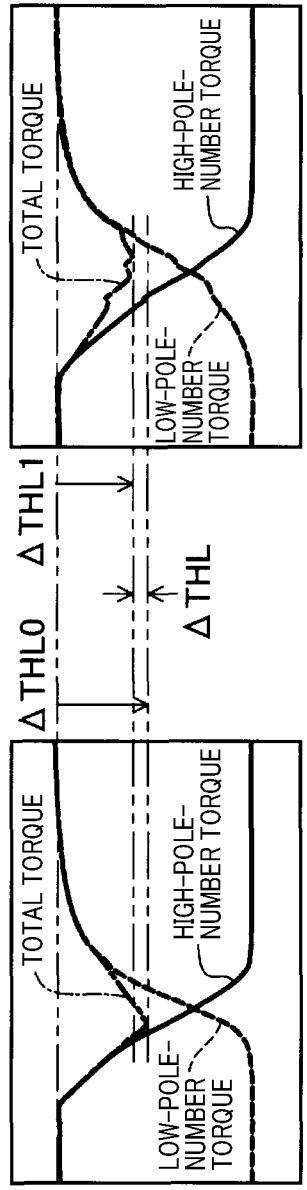
FIG. 11 is an explanatory diagram illustrating the advantageous effects of the first embodiment in the case of switching from the high-pole-number drive to the low-pole-number drive.

FIG. 11 is an explanatory diagram illustrating the advantageous effects of the first embodiment in the case of switching from the high-pole-number drive to the low-pole-number drive. In FIG. 11, there is also shown a comparative example where the voltage commands Vu*, Vv*, Vw*, Vx*, Vy* and Vz* of the respective phases are calculated by the coordinate converter 470, without prioritizing the drive modes, using the matrix shown in FIG. 8 and based on the first low-pole-number d-axis voltage command VdL*, the first low-pole-number q-axis voltage command VqL*, the first high-pole-number d-axis voltage command VdH* and the first high-pole-number q-axis voltage command VqH*. In the comparative example, the variation in the total torque in the case of switching from the high-pole-number drive to the low-pole-number drive is equal to ΔTHL0. In contrast, in the first embodiment, the variation in the total torque in the case of switching from the high-pole-number drive to the low-pole-number drive is equal to ΔTHL1 that is smaller than ΔTHL0 by ΔTHL.

Figure 12:
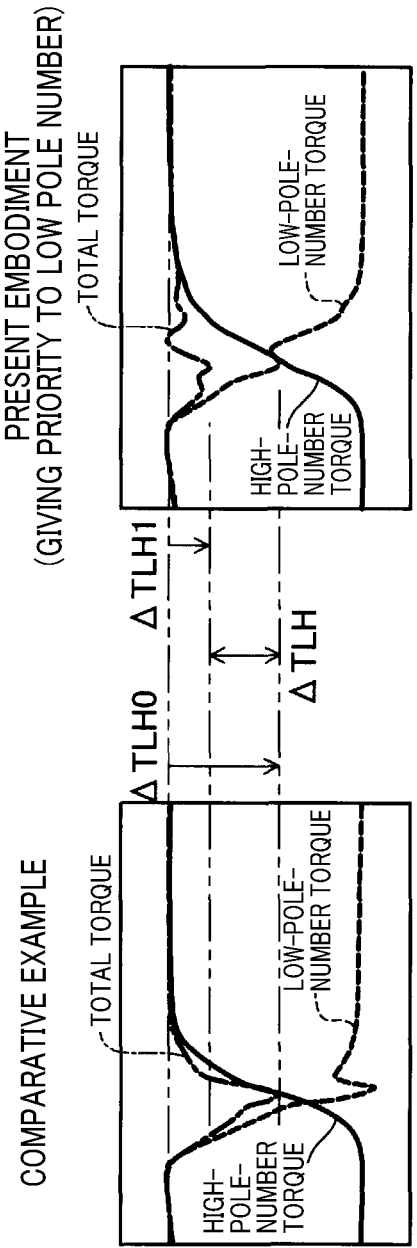
FIG. 12 is an explanatory diagram illustrating the advantageous effects of the first embodiment in the case of switching from the low-pole-number drive to the high-pole-number drive.

FIG. 12 is an explanatory diagram illustrating the advantageous effects of the first embodiment in the case of switching from the low-pole-number drive to the high-pole-number drive. In this case, the variation in the total torque in the comparative example is equal to ΔTHL0, whereas the variation in the total torque in first embodiment is equal to ΔTHL1 that is smaller than ΔTHL0 by ΔTHL.

As above, according to the first embodiment, of the high-pole-number controller 400H and the low-pole-number controller 400L, the controller corresponding to the drive mode given priority by the priority pole-number determiner 410 calculates the voltage commands for the drive mode given priority. In contrast, the controller corresponding to the drive mode not given priority calculates, based on the voltage commands for the drive mode given priority, the voltage commands for the drive mode not given priority. Consequently, it becomes possible to suppress the torque variation during the switching from the high-pole-number drive to the low-pole-number drive or vice versa.

Moreover, according to the first embodiment, by the voltage limiting process, the second high-pole-number dq-axes voltage command VdqH and the second low-pole-number dq-axes voltage command VdqL become a combination of voltages that can be simultaneously outputted.

Second Embodiment

Figure 13:
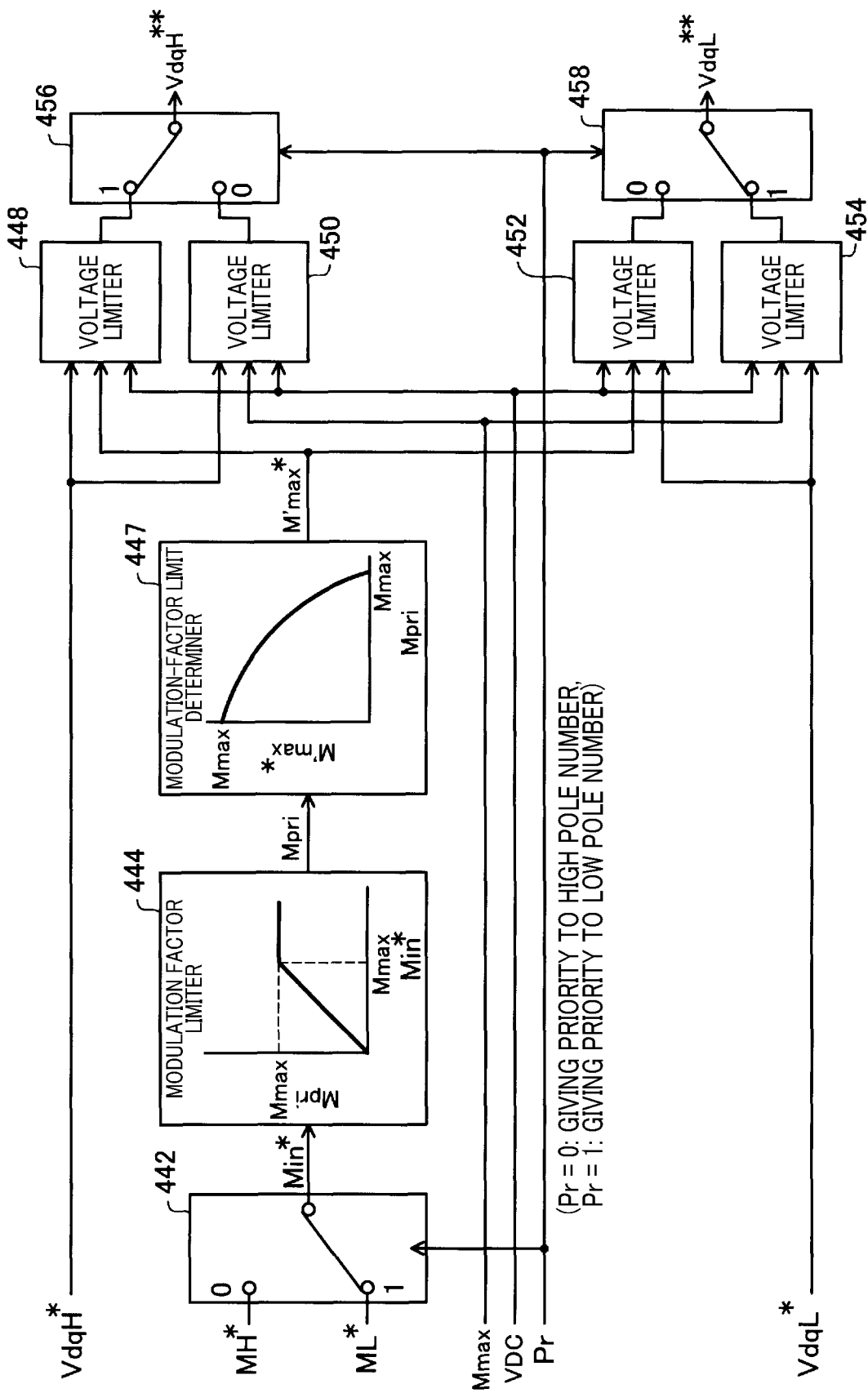
FIG. 13 is an explanatory diagram illustrating the configuration of a voltage limiter according to a second embodiment.

FIG. 13 is an explanatory diagram illustrating the configuration of a voltage limiter 440 according to the second embodiment. In the second embodiment, the first modulation-factor upper limit Mmax is employed when the electric motor 20 operates under either the high-pole-number drive or the low-pole-number drive and the inverter 50 operates outside the linear region, i.e., peaks of the voltage commands (Vu*, Vv*, Vw*, Vx*, Vy*, Vz*) of the respective phases are higher than VDC/2.

The voltage limiter 440 in the second embodiment differs from the voltage limiter 440 in the first embodiment in that a modulation-factor limit determiner 447 is employed instead of the modulation-factor limit determiner 446. In FIG. 13, with the horizontal axis representing the limited modulation factor Mpri and the vertical axis representing the second modulation-factor upper limit M'max*, the relationship between the limited modulation factor Mpri and the second modulation-factor upper limit M'max* is represented by a graph that is convex upward. The modulation-factor limit determiner 447 may include, for example, a table for setting the second modulation-factor upper limit M'max* on the basis of the limited modulation factor Mpri. Alternatively, the modulation-factor limit determiner 447 may set the second modulation-factor upper limit M'max* on the basis of the limited modulation factor Mpri by computation. Moreover, the first modulation-factor upper limit Mmax may be equal to 4/π. In this case, it is possible to maximally utilize the voltage VDC of the electric power source of the inventor 50.

Figure 14:
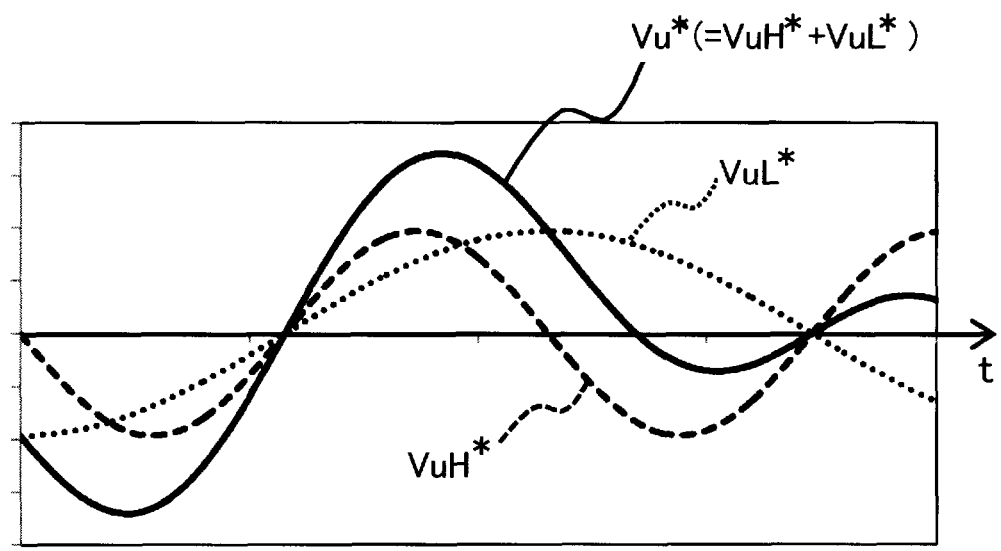
FIG. 14 is a graph illustrating the u-phase voltage command in the second embodiment.

FIG. 14 is a graph illustrating the u-phase voltage command Vu* in the second embodiment. The voltage command Vu* is the sum of the voltage command VuH* for the high-pole-number drive and the voltage command VuL* for the low-pole-number drive.

Figure 15:
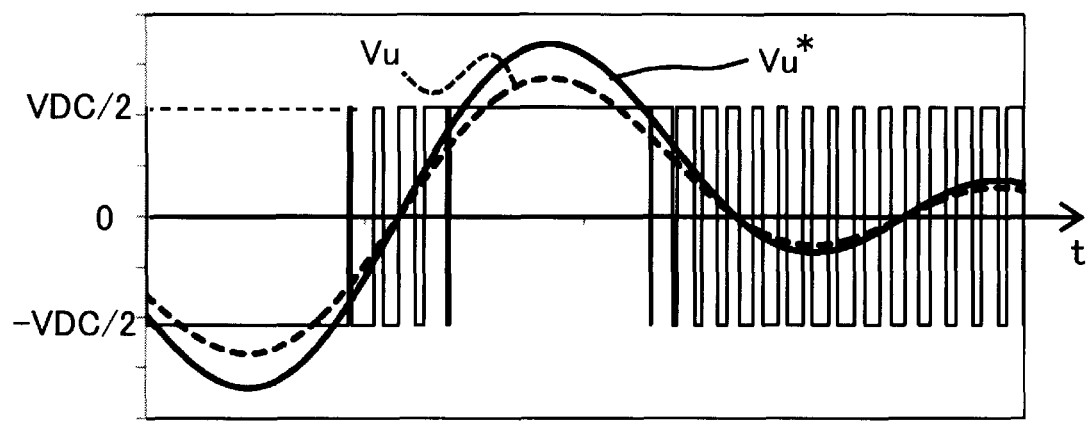
FIG. 15 is an explanatory diagram illustrating both the u-phase voltage command and the u-phase output voltage of the inverter when peaks of the u-phase voltage command are higher than VDC/2 in the second embodiment.

FIG. 15 is an explanatory diagram illustrating both the u-phase voltage command Vu* and the u-phase output voltage Vu of the inverter 50 when peaks of the u-phase voltage command Vu* are higher than VDC/2 in the second embodiment. In the range where the u-phase voltage command Vu* exceeds VDC/2, the u-phase output voltage Vu is in the form of a single wide pulse.

In the second embodiment, the second modulation-factor upper limit M'max* is set so that peaks of each total phase-voltage command, which is the sum of the corresponding second voltage command for the drive mode given priority and the corresponding second voltage command for the drive mode not given priority, are higher than ½ of the electric power source voltage VDC. Therefore, the second modulation-factor upper limit M'max* in the second embodiment is higher than the second modulation-factor upper limit M'max* in the first embodiment. Consequently, in the second embodiment, it becomes possible to perform the drive mode switching from a higher-output region. Moreover, it also becomes possible to utilize a higher voltage for both the high-pole-number drive and the low-pole-number drive during the drive mode switching, thereby improving the electric current responsiveness during the drive mode switching.

As above, the modulation-factor limit determiner 446 is employed in the first embodiment, whereas the modulation-factor limit determiner 447 is employed in the second embodiment. However, the voltage limiter 440 may include both the table of the modulation-factor limit determiner 446 and the table of the modulation-factor limit determiner 447 and selectively use either of the tables according to the peaks of the voltage commands (Vu*, Vv*, Vw*, Vx*, Vy*, Vz*) of the respective phases. In addition, the same modification can also be made in the case of setting the second modulation-factor upper limit M'max* by computation.

Third Embodiment

Figure 16:
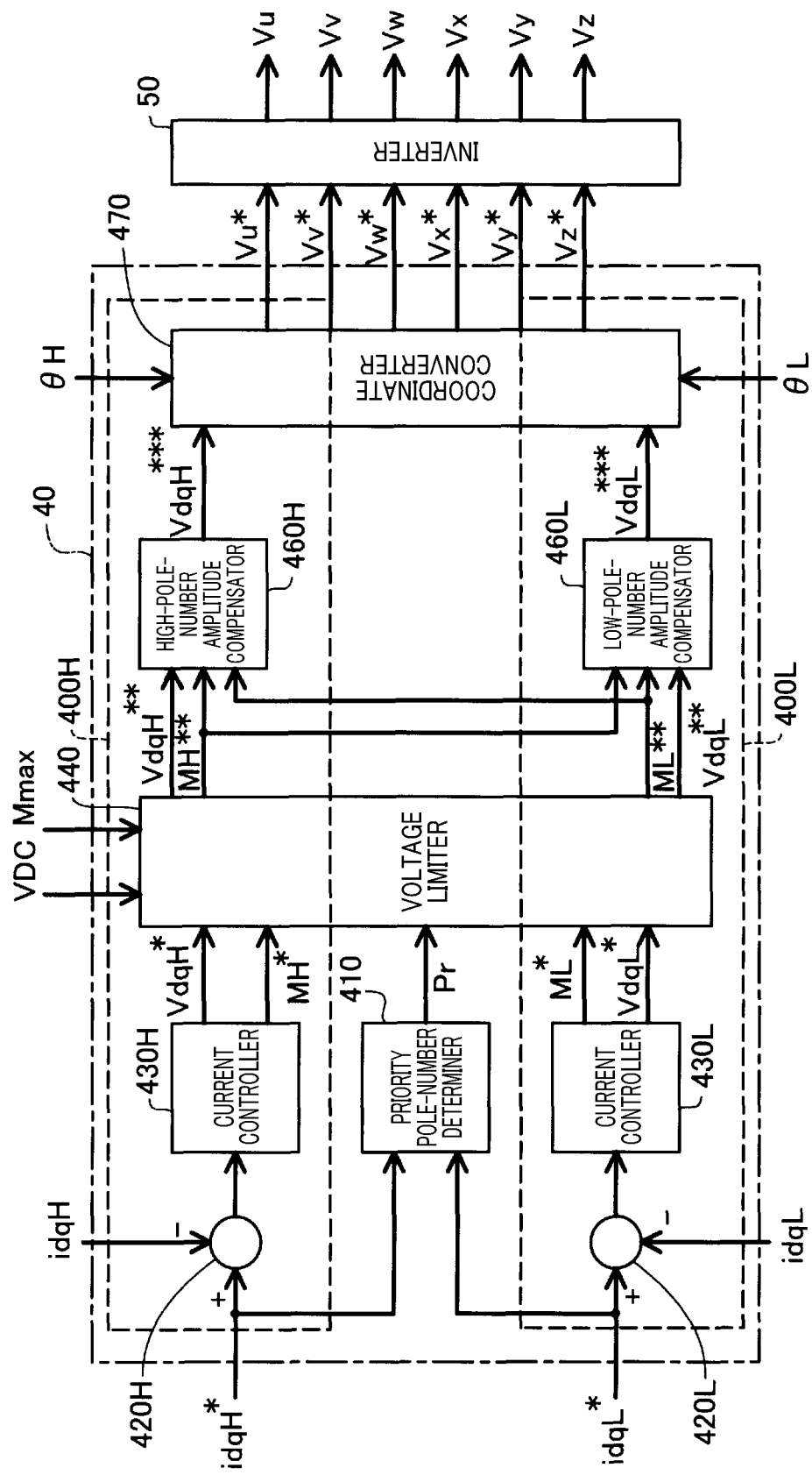
FIG. 16 is an explanatory diagram illustrating the overall configuration of a high-pole-number & low-pole-number controller according to a third embodiment.

FIG. 16 is an explanatory diagram illustrating the overall configuration of a high-pole-number & low-pole-number controller 40 according to the third embodiment. The third embodiment can be applied to cases where peaks of each total phase-voltage command, which is the sum of the corresponding second voltage command for the drive mode given priority and the corresponding second voltage command for the drive mode not given priority, are higher than ½ of the electric power source voltage VDC. The high-pole-number & low-pole-number controller 40 in the third embodiment differs from the high-pole-number & low-pole-number controller 40 in the second embodiment in that a high-pole-number amplitude compensator 460H and a low-pole-number amplitude compensator 460L are provided between the voltage limiter 440 and the coordinate converter 470 in the third embodiment.

The voltage limiter 440 calculates, in addition to the second high-pole-number dq-axes voltage command VdqH and the second low-pole-number dq-axes voltage command VdqL, a second high-pole-number modulation-factor command MH and a second low-pole-number modulation-factor command ML on the basis of the first high-pole-number dq-axes voltage command VdqH*, the first high-pole-number modulation-factor command MH*, the first low-pole-number dq-axes voltage command VdqL*, the first low-pole-number modulation-factor command ML*, the electric power source voltage VDC of the inverter 50 and the first modulation-factor upper limit Mmax. Specifically, the second high-pole-number modulation-factor command MH and the second low-pole-number modulation-factor command ML are calculated respectively by the following equations.

[Equation 3]

$$M_H^{} = \sqrt{\frac{2}{3}} \frac{\sqrt{(V_{dH}^{})^2 + (V_{qH}^{**})^2}}{V_{DC}/2} \quad (3)$$

[Equation 4]

$$M_L^{} = \sqrt{\frac{2}{3}} \frac{\sqrt{(V_{dL}^{})^2 + (V_{qL}^{**})^2}}{V_{DC}/2} \quad (4)$$

Figure 17:
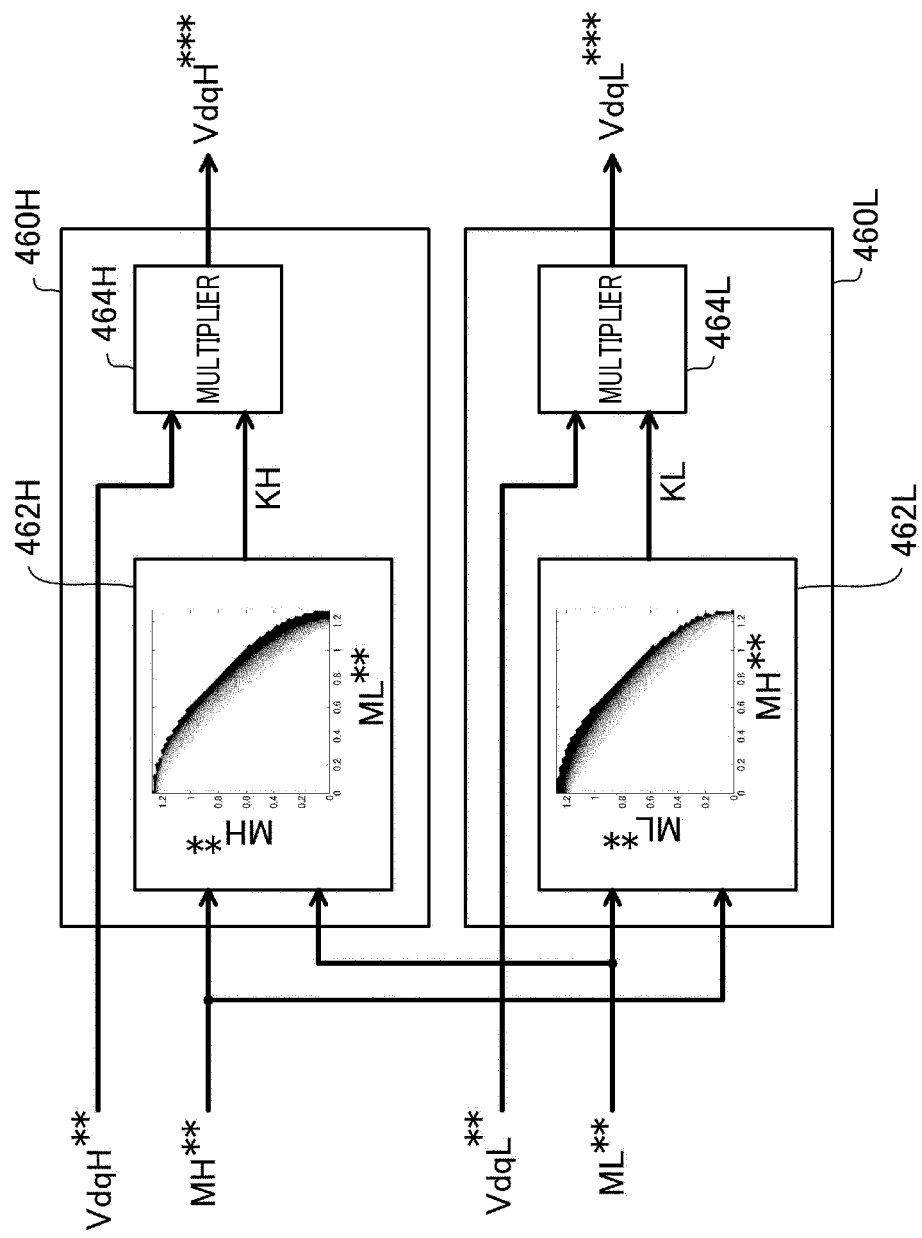
FIG. 17 is an explanatory diagram illustrating the overall configuration of both a high-pole-number amplitude compensator and a low-pole-number amplitude compensator in the third embodiment.

FIG. 17 is an explanatory diagram illustrating the overall configuration of both the high-pole-number amplitude compensator 460H and the low-pole-number amplitude compensator 460L. The high-pole-number amplitude compensator 460H includes a high-pole-number amplitude compensation gain calculator 462H and a multiplier 464H. The high-pole-number amplitude compensation gain calculator 462H includes a two-dimensional table for setting a high-pole-number amplitude compensation gain KH on the basis of the second high-pole-number modulation-factor command MH and the second low-pole-number modulation-factor command ML. The table shown in FIG. 17 is such that the darker the color of the gradation, the larger the value of the high-pole-number amplitude compensation gain KH. The multiplier 464H calculates a third high-pole-number dq-axes voltage command VdqH* by multiplying the second high-pole-number dq-axes voltage command VdqH and the high-pole-number amplitude compensation gain KH together.

The low-pole-number amplitude compensator 460L includes a low-pole-number amplitude compensation gain calculator 462L and a multiplier 464L. The low-pole-number amplitude compensation gain calculator 462L includes a two-dimensional table for setting a low-pole-number amplitude compensation gain KL on the basis of the second low-pole-number modulation-factor command ML and the second high-pole-number modulation-factor command MH. The table shown in FIG. 17 is such that the darker the color of the gradation, the larger the value of the low-pole-number amplitude compensation gain KL. The multiplier 464L calculates a third low-pole-number dq-axes voltage command VdqL* by multiplying the second low-pole-number dq-axes voltage command VdqL and the low-pole-number amplitude compensation gain KL together. In addition, the values of the amplitude compensation gains KH and KL are set so that the amplitudes of a high-pole-number fundamental component and a low-pole-number fundamental component of each phase voltage outputted from the inverter 50 respectively coincide with the amplitudes of a fundamental component of a phase-voltage command corresponding to the second high-pole-number dq-axes voltage command VdqH and a fundamental component of a phase-voltage command corresponding to the second low-pole-number dq-axes voltage command VdqL.

When the voltage commands Vu*, Vv*, Vw*, Vx*, Vy* and Vz* of the respective phases based on the second high-pole-number dq-axes voltage command VdqH and the second low-pole-number dq-axes voltage command VdqL exceed VDC/2, the values of the amplitude compensation gains KH and KL are larger than 1. In contrast, when the voltage commands Vu*, Vv*, Vw*, Vx*, Vy* and Vz* of the respective phases based on the second high-pole-number dq-axes voltage command VdqH and the second low-pole-number dq-axes voltage command VdqL are lower than or equal to VDC/2, the values of the amplitude compensation gains KH and KL are equal to 1. This is equivalent to the case of no amplitude compensation gains being applied.

In the third embodiment, the coordinate converter 470 shown in FIG. 16 calculates, using the matrix shown in FIG. 8, the voltage commands Vu*, Vv*, Vw*, Vx*, Vy* and Vz* of the respective phases on the basis of the third low-pole-number d-axis voltage command VdL*, the third low-pole-number q-axis voltage command VqL*, the third high-pole-number d-axis voltage command VdH* and the third high-pole-number q-axis voltage command VqH*.

As above, according to the third embodiment, it is possible to calculate, by multiplying the second high-pole-number dq-axes voltage command VdqH and the second low-pole-number dq-axes voltage command VdqL respectively by the high-pole-number amplitude compensation gain KH and the low-pole-number amplitude compensation gain KL, the third high-pole-number dq-axes voltage command VdqH* and the third low-pole-number dq-axes voltage command VdqL* such that the average voltages of the output voltages of the inverter 50 become equal to VdqH and VdqL.

In the above-described embodiments, the electric motor 20 has the windings 20*u*-20*z* star-connected together. However, the connection of the windings 20*u*-20*z* is not limited to the star connection provided that the drive mode of the electric motor 20 can be switched between the high-pole-number drive and the low-pole-number drive. For example, the windings 20*u*-20*z* may alternatively be Δ-connected. Moreover, the windings 20*u*-20*z* may be divided into a plurality of winding sets. For example, the windings 20*u*-20*w* may be star-connected together to form a winding set; and the windings 20*x*-20*z* may be star-connected together to form another winding set. Furthermore, the electric motor 20 is not limited to a six-phase electric motor. For example, the electric motor 20 may alternatively be an electric motor having more than six phases.

The present disclosure is not limited to the above-described embodiments and can be carried out in various modes without departing from the spirit of the invention. For example, to solve some or all of the above-described problems or to achieve some or all of the above-described advantageous effects, the technical features of the embodiments corresponding to the technical features of various modes described in "the summary of the invention" section may be suitably replaced or combined with each other. Moreover, unless described as being essential in the present description, some of the technical features may be suitably canceled. For example, part of the configurations realized by hardware in the above-described embodiments may alternatively realized by software. In contrast, at least part of the configurations realized by software may alternatively be realized by discrete circuit configurations.

In addition, the present disclosure may be embodied in various modes, such as a motor control method in addition to the motor control apparatus.

What is claimed is:

1. A motor control apparatus capable of performing, for an electric motor having a plurality of windings, switching of the number of poles of the electric motor between m different numbers of poles, where m is an integer greater than or equal to 2, the control apparatus comprising:
a high-pole-number controller that generates a voltage command for high-pole-number drive of the electric motor, where the number of poles of the electric motor is larger, and controls operation of the electric motor under the high-pole-number drive;
a low-pole-number controller that generates a voltage command for low-pole-number drive of the electric motor, where the number of poles of the electric motor is smaller, and controls operation of the electric motor under the low-pole-number drive; and
a priority pole-number determiner that determines which one of the high-pole-number drive and the low-pole-number drive is to be given priority during switching between the high-pole-number drive and the low-pole-number drive,
wherein
during the switching between the high-pole-number drive and the low-pole-number drive, of the high-pole-number controller and the low-pole-number controller, the controller corresponding to the drive given priority by the priority pole-number determiner calculates the voltage command for the drive given priority, and
the controller corresponding to the drive not given priority calculates, based on the voltage command for the drive given priority, the voltage command for the drive not given priority.

2. The motor control apparatus as set forth in claim 1, wherein the high-pole-number controller and the low-pole-number controller calculate, based on an operating state of the electric motor, first voltage commands and first modulation-factor commands respectively for the high-pole-number drive and the low-pole-number drive,
of the high-pole-number controller and the low-pole-number controller, the controller corresponding to the drive given priority generates, based on the first voltage command for the drive given priority, a second voltage command for the drive given priority as the voltage command for the drive given priority,
the controller corresponding to the drive not given priority generates, based on the first voltage command for the drive not given priority and the first modulation-factor command for the drive given priority, a second voltage command for the drive not given priority as the voltage command for the drive not given priority, and
the second voltage command for the drive given priority and the second voltage command for the drive not given priority constitute a combination of voltages that can be simultaneously outputted respectively in the high-pole-number drive and the low-pole-number drive.

3. The motor control apparatus as set forth in claim 2, wherein the priority pole-number determiner determines, based on the operating state of the electric motor, which one of the high-pole-number drive and the low-pole-number drive is to be given priority.

4. The motor control apparatus as set forth in claim 3, wherein during the switching of the drive of the electric motor from the high-pole-number drive to the low-pole-number drive, the controllers generate the respective second voltage commands with the low-pole-number drive being given priority.

5. The motor control apparatus as set forth in claim 3, wherein during the switching of the drive of the electric motor from the low-pole-number drive to the high-pole-number drive, the controllers generate the respective second voltage commands with the low-pole-number drive being given priority.

6. The motor control apparatus as set forth in claim 3, wherein during the switching of the drive of the electric motor from the low-pole-number drive to the high-pole-number drive, the controllers generate the respective second voltage commands with the high-pole-number drive being given priority.

7. The motor control apparatus as set forth in claim 3, wherein during the switching of the drive of the electric motor from the high-pole-number drive to the low-pole-number drive, the controllers generate the respective second voltage commands with the high-pole-number drive being given priority.

8. The motor control apparatus as set forth in claim 2, wherein the controller corresponding to the drive given priority generates the second voltage command for the drive given priority by limiting the first voltage command for the drive given priority so as not to exceed a first modulation-factor upper limit, and
the controller corresponding to the drive not given priority generates the second voltage command for the drive not given priority by limiting the first voltage command for the drive not given priority so as not to exceed a second modulation-factor upper limit that is generated from the second voltage command for the drive given priority.

9. The motor control apparatus as set forth in claim 8, wherein the first modulation-factor upper limit is a value such that during operation of the electric motor under either the high-pole-number drive or the low-pole-number drive, an inverter, which is configured to supply voltages to the windings of the electric motor, operates within a linear region, and
the second modulation-factor upper limit is a value obtained by subtracting a modulation factor command, which corresponds to the second voltage command for the drive given priority, from the first modulation-factor upper limit.

10. The motor control apparatus as set forth in claim 8, wherein the first modulation-factor upper limit is larger than a value such that during operation of the electric motor under either the high-pole-number drive or the low-pole-number drive, an inverter, which is configured to supply voltages to the windings of the electric motor, operates within a linear region, and
the second modulation-factor upper limit is a value such that a peak of a total phase-voltage command, which is the sum of the second voltage command for the drive given priority and the second voltage command for the drive not given priority, exceeds ½ of an electric power source voltage.

11. The motor control apparatus as set forth in claim 10, wherein the first modulation-factor upper limit is equal to $4/\pi$.

12. The motor control apparatus as set forth in claim 2, wherein when a peak of a total phase-voltage command, which is the sum of the second voltage command for the drive given priority and the second voltage command for the drive not given priority, exceeds ½ of an electric power source voltage, the high-pole-number controller and the low-pole-number controller generate, as the voltage commands for the high-pole-number drive and the low-pole-number drive, third voltage commands by multiplying the respective second voltage commands by respective amplitude compensation gains that are larger than 1.

13. The motor control apparatus as set forth in claim 12, wherein the amplitude compensation gains are set based on a high-pole-number modulation-factor command corresponding to the second voltage command for the high-pole-number drive and a low-pole-number modulation-factor command corresponding to the second voltage command for the low-pole-number drive, and values of the amplitude compensation gains are set so that the amplitudes of a high-pole-number fundamental component and a low-pole-number fundamental component of a phase voltage outputted from an inverter respectively coincide with the amplitudes of a fundamental component of a phase-voltage command corresponding to the second voltage command for the high-pole-number drive and a fundamental component of a phase-voltage command corresponding to the second voltage command for the low-pole-number drive.

14. The motor control apparatus as set forth in claim 12, wherein when the peak of the total phase-voltage command, which is the sum of the second voltage command for the drive given priority and the second voltage command for the drive not given priority, is lower than or equal to ½ of the electric power source voltage, the second voltage commands are not multiplied by the amplitude compensation gains.

* * * * *